US010248404B2

(12) United States Patent
Garman et al.

(10) Patent No.: US 10,248,404 B2
(45) Date of Patent: Apr. 2, 2019

(54) MANAGING UPDATE DEPLOYMENT

(71) Applicant: Amazon Technologies, Inc., Seattle, WA (US)

(72) Inventors: Matthew S. Garman, Seattle, WA (US); Nathan Bartholomew Thomas, Seattle, WA (US); Gang Li, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 284 days.

(21) Appl. No.: 15/089,338

(22) Filed: Apr. 1, 2016

(65) Prior Publication Data

US 2016/0216960 A1    Jul. 28, 2016

Related U.S. Application Data

(62) Division of application No. 13/532,598, filed on Jun. 25, 2012, now Pat. No. 9,311,066.

(51) Int. Cl.

| | |
|---|---|
| *G06F 9/445* | (2018.01) |
| *G06F 8/65* | (2018.01) |
| *G06F 8/60* | (2018.01) |
| *H04L 12/24* | (2006.01) |
| *H04L 29/08* | (2006.01) |
| *H04L 12/26* | (2006.01) |

(52) U.S. Cl.
CPC ............ *G06F 8/65* (2013.01); *G06F 8/60* (2013.01); *H04L 41/082* (2013.01); *H04L 41/0863* (2013.01); *H04L 43/08* (2013.01); *H04L 67/10* (2013.01); *H04L 67/34* (2013.01); *Y02D 10/42* (2018.01)

(58) Field of Classification Search
CPC ...... G06F 8/65; G06F 8/61; G06F 8/60; H04L 67/10; H04L 41/0893; H04L 43/065; G06Q 10/06313
See application file for complete search history.

(56) References Cited

U.S. PATENT DOCUMENTS

| | | | |
|---|---|---|---|
| 6,988,133 | B1 | 1/2006 | Zavalkovsky et al. |
| 7,555,551 | B1 | 6/2009 | McCorkendale |
| 8,583,769 | B1 | 11/2013 | Peters et al. |
| 2004/0213159 | A1 | 10/2004 | Helgesen |
| 2006/0080656 | A1 | 4/2006 | Cain et al. |
| 2006/0248116 | A1 | 11/2006 | Sobel |

(Continued)

*Primary Examiner* — Chirag R Patel
(74) *Attorney, Agent, or Firm* — Knobbe, Martens, Olson & Bear LLP (57) ABSTRACT

Systems and methods for managing deployment of an update to computing devices are provided. An update deployment manager determines one or more initial computing devices to receive and execute an update. The update deployment manager further monitors a set of performance metrics with respect to the initial computing devices or a collection of computing devices. The update deployment manager may modify the rate of deployment based on the monitored performance metrics. For example, the update deployment manager may select additional computing devices to receive and execute an update. Further, the update deployment manager may halt deployment of the update. Moreover, the update deployment manager may rollback the deployment of the update.

17 Claims, 6 Drawing Sheets

(56) References Cited

U.S. PATENT DOCUMENTS

| | | | |
|---|---|---|---|
| 2007/0043831 A1* | 2/2007 | Kessler | H04L 67/34 |
| | | | 709/219 |
| 2007/0118530 A1* | 5/2007 | Chow | G06F 8/65 |
| 2007/0168744 A1 | 7/2007 | Pal et al. | |
| 2008/0027948 A1 | 1/2008 | Corley et al. | |
| 2009/0106737 A1 | 4/2009 | Chockler et al. | |
| 2009/0150878 A1 | 6/2009 | Pathak et al. | |
| 2009/0320019 A1* | 12/2009 | Ellington | G06F 8/71 |
| | | | 717/177 |
| 2010/0131084 A1 | 5/2010 | Van Camp | |
| 2010/0169879 A1 | 7/2010 | Takeda | |
| 2010/0180040 A1 | 7/2010 | Friedman | |
| 2010/0257513 A1 | 10/2010 | Thirumalai et al. | |
| 2010/0281482 A1 | 11/2010 | Pike et al. | |
| 2010/0318986 A1 | 12/2010 | Burke et al. | |
| 2011/0231552 A1* | 9/2011 | Carter | G06F 9/5072 |
| | | | 709/226 |
| 2012/0030658 A1 | 2/2012 | Hu et al. | |
| 2012/0136993 A1 | 5/2012 | Gao et al. | |
| 2012/0259722 A1 | 10/2012 | Mikurak | |
| 2013/0055337 A1 | 2/2013 | Choi et al. | |
| 2013/0111497 A1 | 5/2013 | Chen et al. | |
| 2013/0179876 A1 | 7/2013 | Aliminati | |

* cited by examiner

MANAGING UPDATE DEPLOYMENT

CROSS-REFERENCE TO RELATED APPLICATION

This application is a divisional of U.S. patent application Ser. No. 13/532,598, entitled MANAGING UPDATE DEPLOYMENT and filed Jun. 25, 2012, the entirety of which is incorporated by reference herein.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, individual computing devices within a data center may be configured to provide specific functionality according to the requirements of the data center. For example, various computing devices may be associated with different operating systems or operating system configurations to enable a computing device to provide different desired functionalities, or to provide similar functionalities more efficiently. Moreover, virtualization technologies may allow a single physical computing device to host one or more instances of a virtual machine (e.g., a virtual computing device), which virtual computing device instance appears to a user of a data center as an independent computing device. With virtualization, the host computing device can create, maintain, delete, or otherwise manage virtual computing device instances in a dynamic manner. In turn, users can request computing resources from the data center, including single computing devices or a configuration of networked computing devices, and be provided with virtual computing device instances that provide the requested computing resources.

An individual computing device or instance of a virtual computing device may be configured to provide specific functionality. For example, a computing device (e.g., physical or virtual) may be associated with different combinations of software applications and operating systems or operating system configurations to enable the computing device to provide different desired functionalities, or to provide similar functionalities more efficiently. Software and software configurations (e.g., operating systems, applications, drivers, modules, etc., and configurations thereof) are often contained within updates or update packages which a computing device may execute in order to implement a desired specific functionality corresponding to the contents of the update.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Generally described, aspects of the present disclosure relate to the deployment of software updates or update packages to computing devices, and management thereof. Specifically, systems and methods are disclosed which facilitate controlled deployment of an update according to a set of monitored performance metrics. An update may generally refer to any item or collection of items that may be installed, executed, or implemented by a computing device (e.g., a user computing device, a server computing device, a virtual computing device, a networking device, or any other computing device). For example, an update or update package may include an operating system, an application, a driver, a module, and configurations thereof. Moreover, an update may include commands, collections of commands, scripts, etc., which may be implemented by a computing device, Deployment of an update may refer to receiving and implementing the update on a computing device (e.g., in response to receiving a deployment command).

In an illustrative embodiment, an update deployment manager may deploy an update to a set of computing devices, while concurrently monitoring for potential effects of deploying the update. In some embodiments, the update deployment manager may monitor the set of computing devices themselves (e.g., to ascertain direct effects of deploying the update). In other embodiments, the update deployment manager may monitor alternative computing devices which may be affected by deployment of the update. For example, an update deployed to a back-end or non-user facing computing device may affect performance of a front-end or user facing computing device. As such, in order to deploy the update to an initial set of computing devices, the update deployment manager may issue an update deployment command to an initial set of computing devices. Thereafter, the computing devices in the initial set may receive and implement the update. During or subsequent to implementation of the update, the update deployment manager may receive monitoring information from a set of monitored computing devices, which may include one or more of the computing devices in the initial set. Illustratively, monitoring information may include any of a number of performance metrics of the operation of a computing device, such as latency, communication failure rate, available or used processing power, etc., as will be described in more detail below. In response to received monitoring information, the update deployment manager may modify further deployment of the update to additional computing devices. For example, received monitoring information may indicate that deployment of the update had a negative effect on one or more computing devices. As such, the update deployment manager may slow deployment of the update (e.g., to gather further information regarding the effects of the update), halt deployment of the update, or rollback the update (e.g., cause the initial set of computing devices to remove, uninstall, or de-implement the update). Conversely, received monitoring information may indicate that deployment of the update had a neutral or positive effect on one or more computing devices. As such, the update deployment manager may continue to deploy the update at a given rate, or increase the rate of deployment of the update.

As described above, the update deployment manager may modify aspects related to the deployment of an update. In some embodiments, modifying an aspect of the deployment of the update may include modifying the rate of deployment. For example, where performance metrics associated with the update or the computing devices implementing the update are positive (e.g., decreased latency, increased availability of processing power, etc.), the update deployment manager may increase the rate of deployment of the update for future deployments. Illustratively, the update may be deployed to a large collection of additional computing devices. As a further example, if performance metrics associated with the update or the computing devices implementing the update are negative, the update deployment manager may decrease the rate of deployment of the update. In some embodiments, where performance metrics are negative, deployment of an update may be halted. In still more embodiments, where performance metrics are negative, an update may be rolled back. As used herein, rollback of an update may generally refer to removing the update from one or more computing devices (e.g., by uninstalling the update or undoing modifications caused by the update). As such, the deployment of an update to multiple computing devices may be controlled based on monitored performance metrics gathered in response to deployment.

In some embodiments, performance metrics that are to be monitored may be customized based on the update to be deployed. For example, where an update includes an update to a database application, performance metrics may include response time of queries to the database and a number of unsuccessful (e.g., dropped) queries to the database after deployment of the update. Moreover, in some embodiments, performance metrics may be monitored on additional applications or services. For example, a database for which an update is to be deployed may facilitate the operation of a web server. As such, performance metrics may include the performance of the web server (e.g., latency, timed out requests, etc.). As such, performance metrics may be selected to include "real-world" results of a deployment. Further, performance metrics of such "real-world" results may be more influential than other performance metrics when determining modification to an update deployment. For example, where a deployed update appears to have a moderately negative effect on the base performance of a database, but has no appreciable effect on end-user services reliant on that database, the deployment may continue at a standard rate. Conversely, where a deployed update has no appreciable effect on the base performance of a database, but has a moderate negative effect on end-user services, the deployment of the update may be reduced in rate, halted, or rolled back.

Moreover, performance metrics may correspond to the performance of a computing device in general. For example, performance metrics may include central processing unit (CPU) utilization, random access memory (RAM) utilization, power consumption, persistent data store utilization, network bandwidth utilization, or any additional performance metrics targeted to the operation of the computing device. In some embodiments, performance metrics may be selected based on requirements for operation of a computing device or an application. For example, performance metrics may be selected based on service level agreements (SLAs) corresponding to a computing device or an application.

Still further, performance metrics may be monitored with respect to the computing device implementing an update or a collection of computing devices (including or excluding the implementing computing device). Illustratively, an update modifying a database executing on a first computing device may affect the operation of a web server on a second computing device. As such, the second computing device (or the web service implemented on that computing device) may be monitored according to a set of performance metrics. In some embodiments, performance metrics affected by an update deployment may not be immediately obvious. For example, the ramifications of deployment of an update affecting a low level management application (e.g., a hypervisor) may not be immediately known. As such, performance metrics may include a wide selection of applications or computing devices, whether or not such applications or computing devices are known to potentially be effected by an update deployment.

In some embodiments, monitoring information corresponding to monitored performance metrics (e.g., monitored values of the specified performance metrics) may be stored for future use (e.g., in the selection of future performance metrics). For example, a wide range of performance metrics may be monitored during the initial deployment of an update. Thereafter, the resultant monitoring information may be analyzed to determine potential correlations between specific performance metrics and the deployment (e.g., metrics which appear to be effected by the deployment). Subsequently, performance metrics monitored during deployment of the update may be modified based on this analysis. As an illustrative example, an update corresponding to a network interface device (NIC) driver may be desired to be deployed on a large collection of computing devices. Further, the ramifications of deployment may be unknown. As such, during deployment of the update to an initial subset of the computing devices, a wide range of performance metrics may be monitored. Thereafter, relevant performance metrics may be identified based on analysis of the monitored information. For example, analysis of the monitored performance metrics may reveal that deployment of the update affects network bandwidth utilization, CPU usage, and web site response time. Further, analysis of the monitored performance metrics may indicate that RAM utilization was apparently unaffected. Accordingly, monitored performance metrics may be modified during subsequent deployments (e.g., to more closely monitor network bandwidth, CPU use, and web site response time, while less closely monitoring RAM). Modification of performance metrics may happen during a single deployment to collections of computing devices, or during future deployments. For example, in some embodiments, updates may correspond to web services offered for acquisition to consumers. In these embodiments, a consumer potentially acquiring the update may be informed of the monitored effects of previous deployments of the update, such that they are better able to understand the potential ramifications of acquisition and deployment of the update.

Although aspects of the present disclosure may refer to deployment of an update on multiple computing devices, in some embodiments, deployment of an update on a single computing device may be managed. For example, an update deployment may include multiple stages. As such, monitoring information collected during intermediate stages may be used to modify deployment during subsequent stages. For example, an update deployment of three stages may be implemented on a computing device. Subsequent to or during deployment of the first stage, monitoring information corresponding to a number of performance metrics may be received and analyzed. Based on such analysis, the rate or progression of stages 2 and 3 may be modified. For example, where monitoring information indicates a negative effect of the update deployment, deployment could be halted or rolled back.

In other embodiments, aspects of the present disclosure may relate to deployment of multiple updates. For example, a number of updates may correspond to various versions or flavors of an item of software (e.g., with different configurations, optimizations, etc.). Each update may be deployed in accordance with embodiments of the disclosure. Specifically, the rate of deployment of an update may be modified based on performance metrics monitored during or after deployment. Accordingly, the number of computing devices which receive a given update is dependent on the performance metrics associated with the update. Based on this, the superior update (in terms of performance metrics) would be likely to be deployed to a larger number of computing devices. Analysis of the differences in computing devices with any given version of an update may reveal the superior update in terms of the performance metrics. Further, in some embodiments, superior updates may be deployed "over" (e.g., replace) inferior updates. Accordingly, an evolutionary approach may be taken with respect to update deployment, such that multiple versions of an update may be tested, but that only the high performing update is implemented across a group of computing devices. In some such embodiments, the deployment rate of a given update may be dependent upon the deployment rate of other simultaneous updates. For example, where two updates are simultaneously deployed (or where deployment overlaps), the rate of deployment of a first update may be modified based on the rate of deployment of a second update. Illustratively, if the rate of deployment of the second update increases, the rate of deployment of the first update may be decreased, and vice versa.

Specific embodiments and example applications of the present disclosure will now be described with reference to the drawings. These embodiments and example applications are intended to illustrate, and not limit, the present disclosure.

Figure 1:
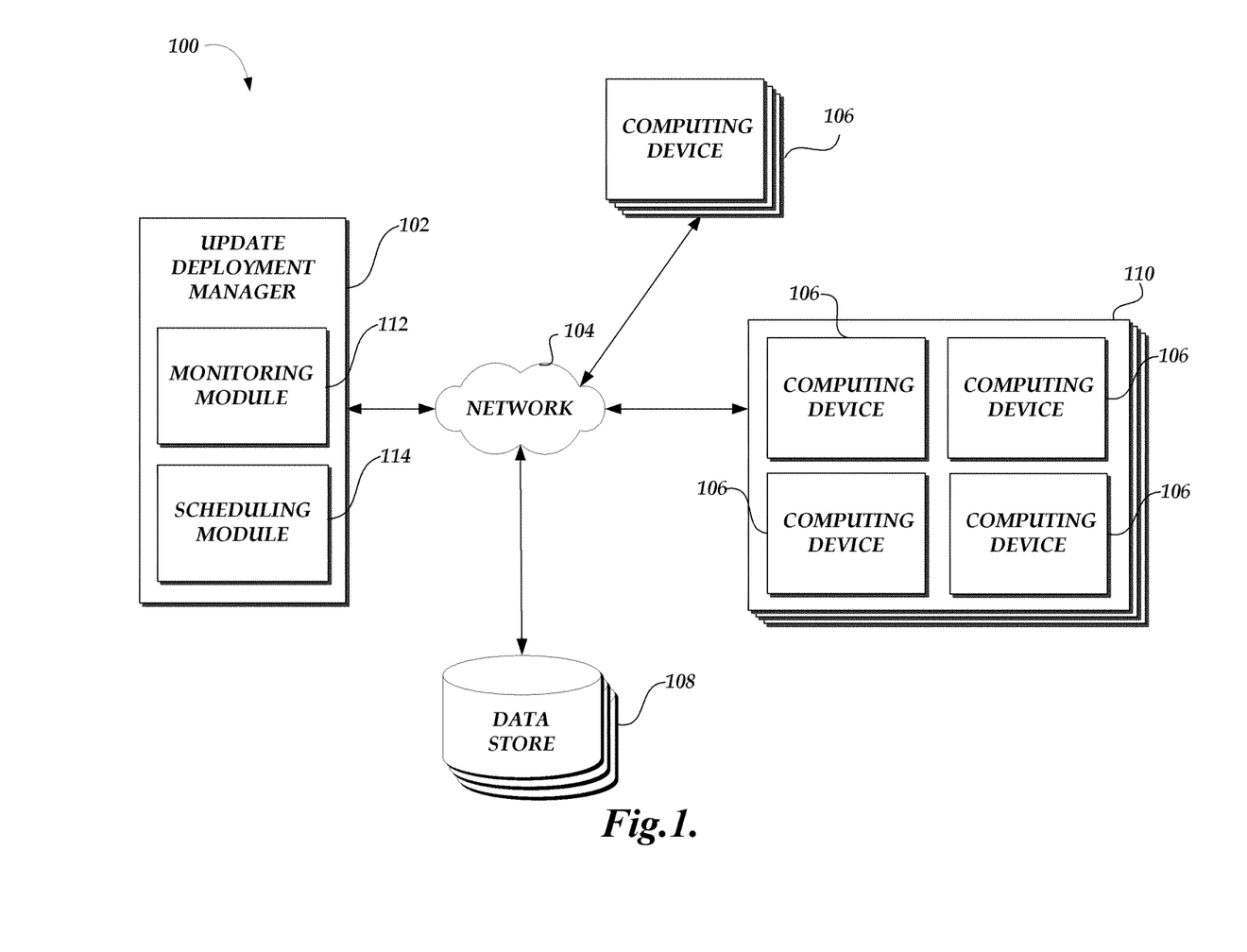
FIG. 1 is a block diagram depicting an illustrative environment for managing update deployment to a multiple computing devices, the environment including a number of computing devices, a number of collections of computing devices, and an update deployment manager.

FIG. 1 is a block diagram depicting an illustrative environment 100 for managing deployment of updates to computing devices. The illustrated environment includes a number of computing devices 106. In the illustrated environment, some computing devices 106 are arranged into collections of computing devices 110. Illustratively, a collection of computing devices may correspond to multiple physical computing devices arranged within a shared housing. In other embodiments, a collection of computing devices may correspond to multiple virtual computing devices, such as virtual machine instances, which share a single physical computing device. In still more embodiments, a collection of computing devices may correspond to a number of computing devices in a given geographic region (e.g., a room, building, city, state, or continent). As will be appreciated by one skilled in the art, a collection of computing devices may correspond to collections of physical computing devices, virtual computing devices, or combinations of the two. Each computing device 106 may be configured to receive an implement a number of updates (e.g., including applications, operating systems, modules, drivers, configurations, or any combination thereof).

The illustrative environment further includes a number of data stores 108. Generally, a data store 108 may correspond to a hard disk drive, network accessible storage, or any other type of perpetual or substantially perpetual storage accessible by one or more of the computing devices 106. For example, the data stores 108 of FIG. 1 may correspond to network accessible storage device. Though depicted as external to computing device 106, in some embodiments, data stores 108 may be internal to a computing device 106.

The illustrated environment further includes a network 104 operable to enable communication between the computing devices 106 (either alone or in a collection 110), the data stores 108, and an update deployment manager 102. The network 104 may be, for instance, a wide area network (WAN), a local area network (LAN), or a global communications network.

Illustratively, the update deployment manager 102 may manage deployment of updates to one or more computing devices 106. Specifically, the update deployment manager 102 may include a monitoring module 112 to by monitor a set of performance metrics prior to, during, or subsequent to deployment of an update. Further, the update deployment manager 102 may include a deployment modification module 114 to modify deployment of the update based on the monitored performance metrics.

As an illustrative example, an operator of the update deployment environment 100 may desire that a give update be deployed and implemented on each of the computing devices 106. As such, the update deployment manager 102 may select an initial set of computing devices to receive the update. Moreover, the update deployment manager 102 may select a set of performance metrics to monitor in conjunction with deployment. In some embodiments, an initial set of computing devices 106 and monitored performance metrics may be manually selected (e.g., based on a selection of an operator of the update deployment manager 102). In other embodiments, either or both of the initial set of computing devices 106 or may be selected automatically. Automatic selection of an initial set of computing devices or performance metrics may be based, by way of non-limiting example, on the update, the configuration of a computing device 106, service level agreements, or a combination thereof.

Thereafter, the update may be distributed to the selected initial computing devices 106. During or after implementation of the update by each of the initial computing devices 106, the update deployment manager 102 (e.g., via the monitoring module 112) may monitor the initial set of computing devices 106 and any additional computing devices 106 based on the selected performance metrics. The update deployment manager 102 may further analyze the monitored performance metrics in order to modify the deployment of the update as necessary. For example, the deployment modification module 114 may determine what effect, if any, deployment of the update had on the monitored performance metrics. If a measured effect is neutral or positive (e.g., decreased response times, increased availability, etc.), the deployment of the update may continue to additional computing devices 106. In some embodiments, if the effect is positive, the rate of deployment of the update to additional computing devices 106 may increase, as will be described below. However, if the measured effect is negative, the deployment modification module 114 may reduce the rate of deployment of the update. Further, in some embodiments, if the measured effect is negative, the deployment modification module 114 may halt deployment of the update. Still further, if the measured effect is negative, the deployment modification module 114 may rollback the update (e.g., by causing the initial set of computing devices 106 to de-implement the update or undo modifications caused by implementing the update).

Thereafter, the update deployment manager 102 may continue to deploy the update to additional computing devices 106, to monitor performance metrics across a number of computing devices 106, and to modify the deployment of the update (e.g. by halting deployment or modifying the rate of deployment of the update) based on the monitored performance metrics. Accordingly, an update deployment may continue without requiring a large amount of manual intervention. Specifically, well performing updates will be deployed quickly, while deployment of low performing updates will be slowed (e.g., to gather additional data regarding performance), halted, or rolled back, according to a set of deployment criteria.

Though monitoring module 112 and scheduling module 114 are depicted in FIG. 1 to be included in the update deployment manager 102, in some embodiments, each computing device 106 may include either or both of a monitoring module 112 and a scheduling module 114. For example, a computing device 106 may include a monitoring module 112 configured to monitor performance metrics on the computing device 106 and report such metrics to the update deployment manager 102). Further, in some embodiments, a computing device 106 may include a scheduling module 114 to manage deployment of an update to the implementing computing device 106 or other computing devices 106. For example, deployment of an update may be facilitated by peer to peer communication, such that each computing device 106 implements an instance of a scheduling module 114 that is configured to deploy an update to one or more additional computing devices 106. In some such embodiments, the update deployment manager 102 may be omitted.

Figure 2:
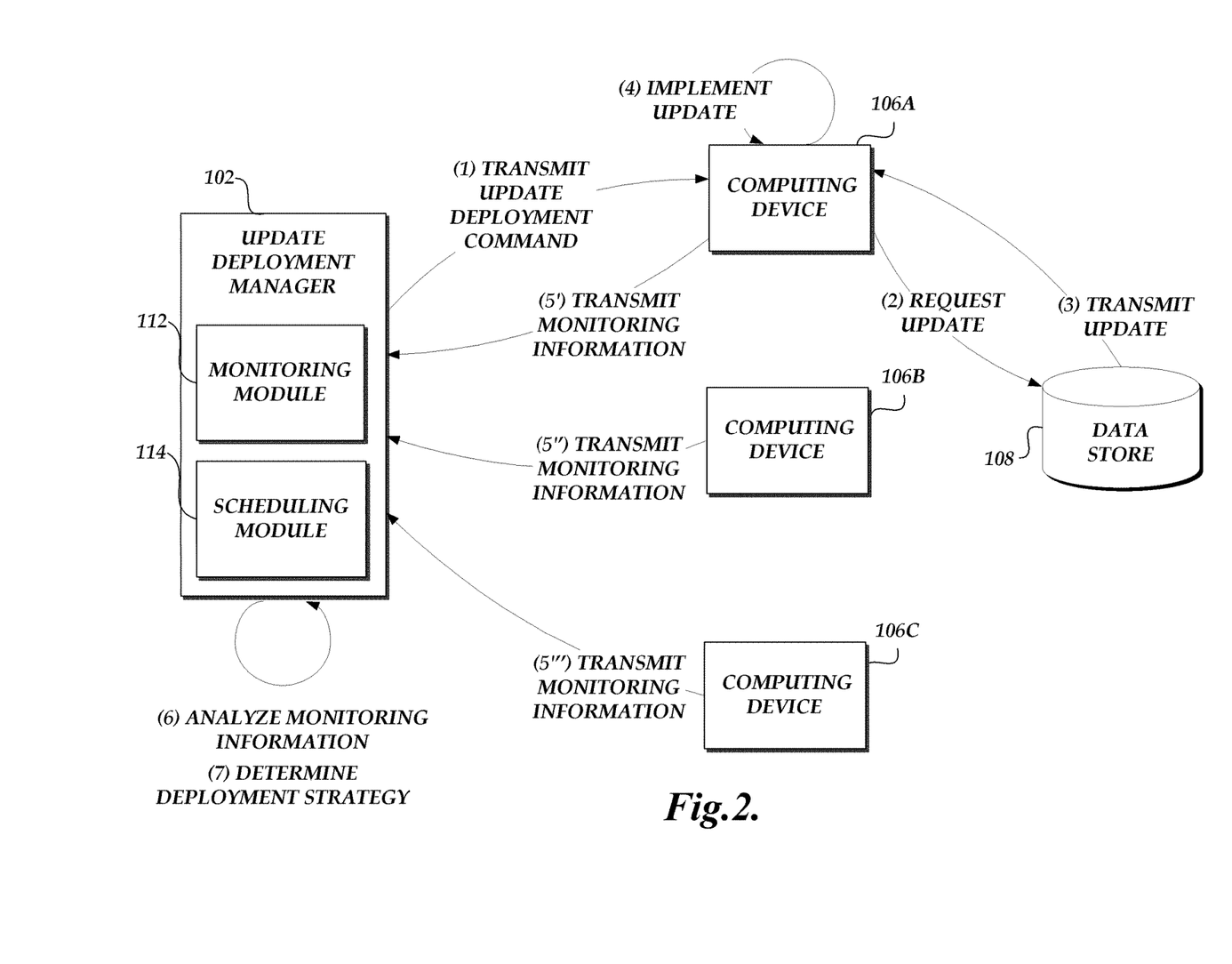
FIG. 2 is a block diagram of the update deployment management environment of FIG. 1 illustrating the deployment of an update to a first computing device and monitoring of performance metrics on a number of computing devices.
Figure 3A:
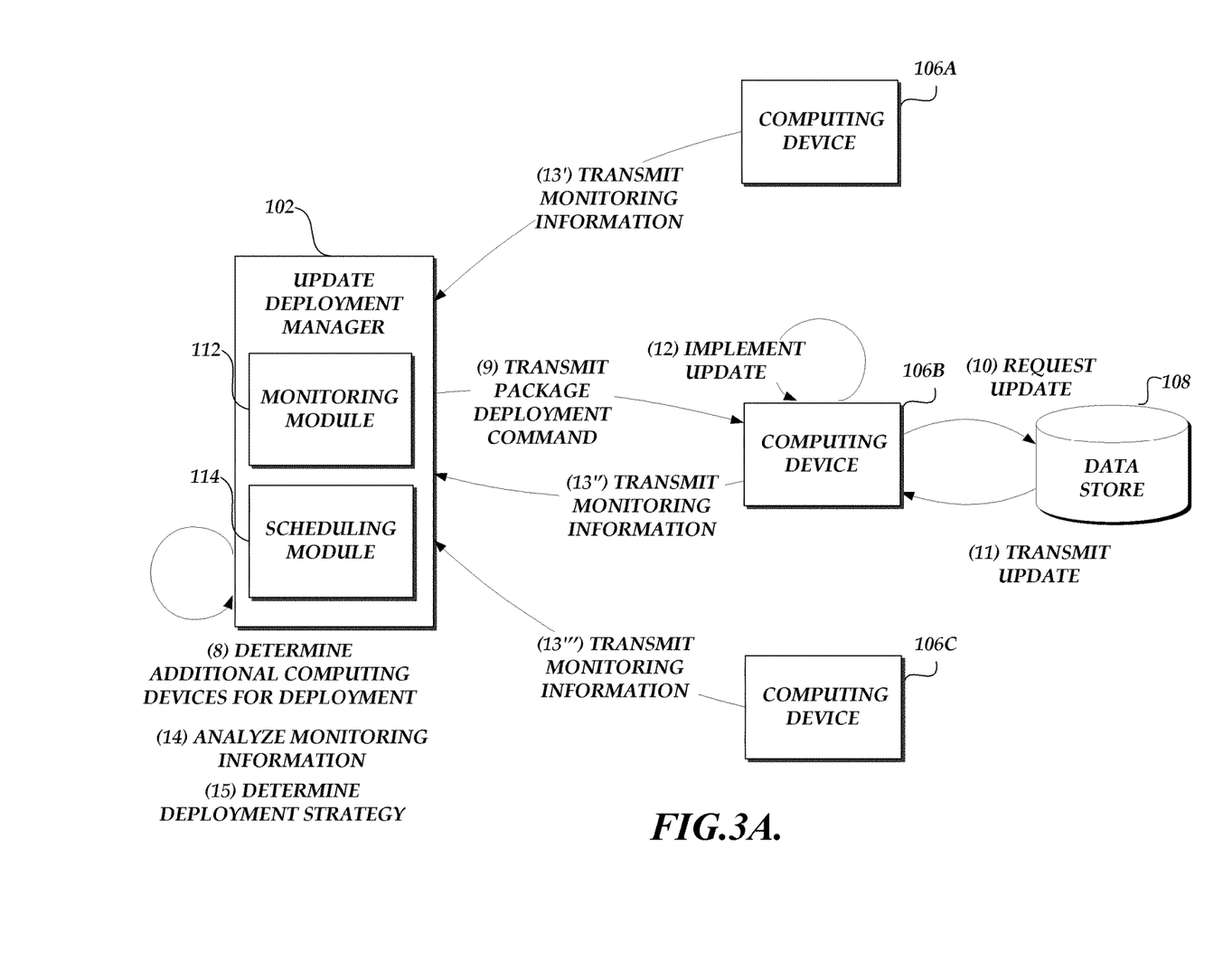
FIGS. 3A-3C are block diagrams of the update deployment management environment of FIG. 1 illustrating the continued deployment of an update to a number of computing devices in response to monitored performance metrics.
Figure 3B:
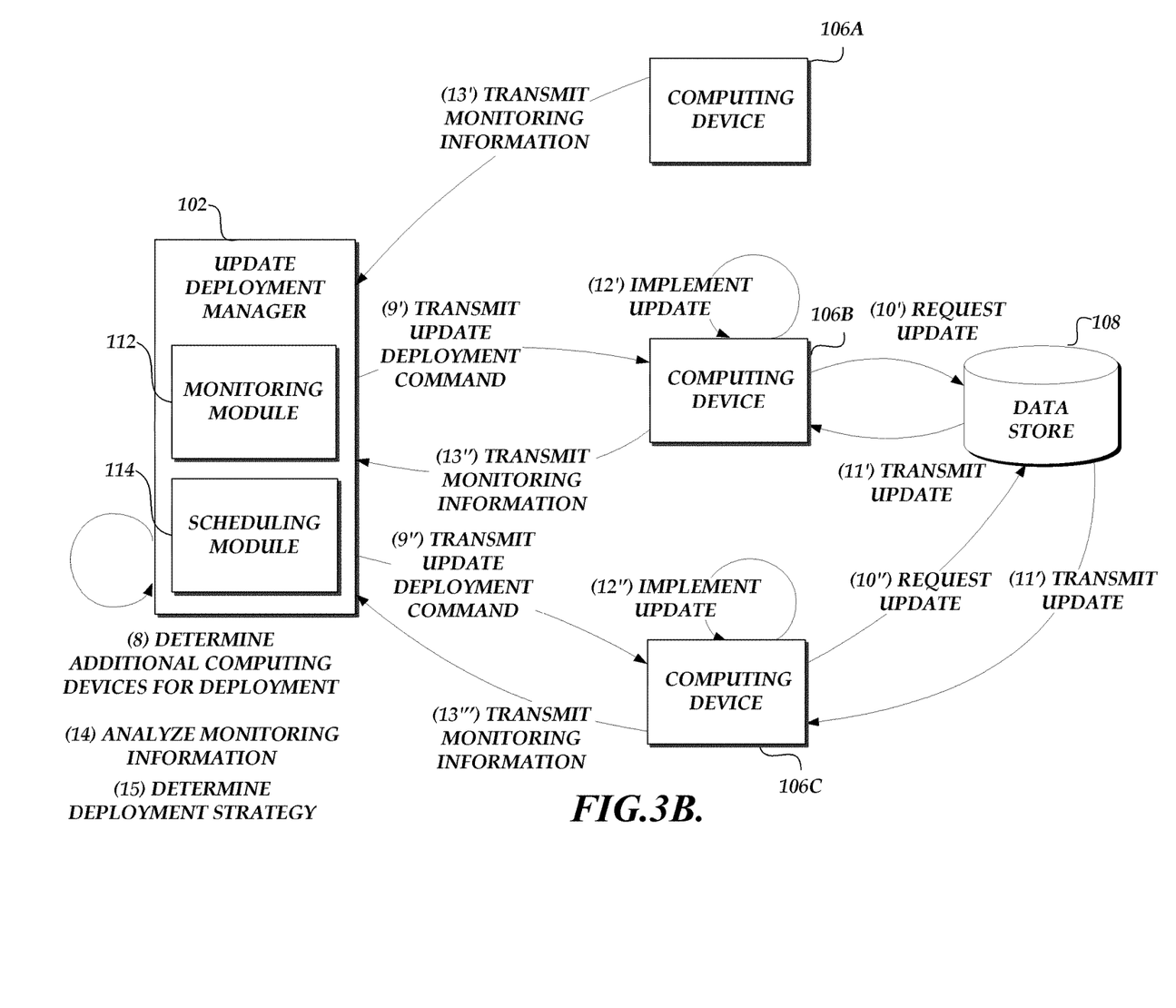
Figure 3C:
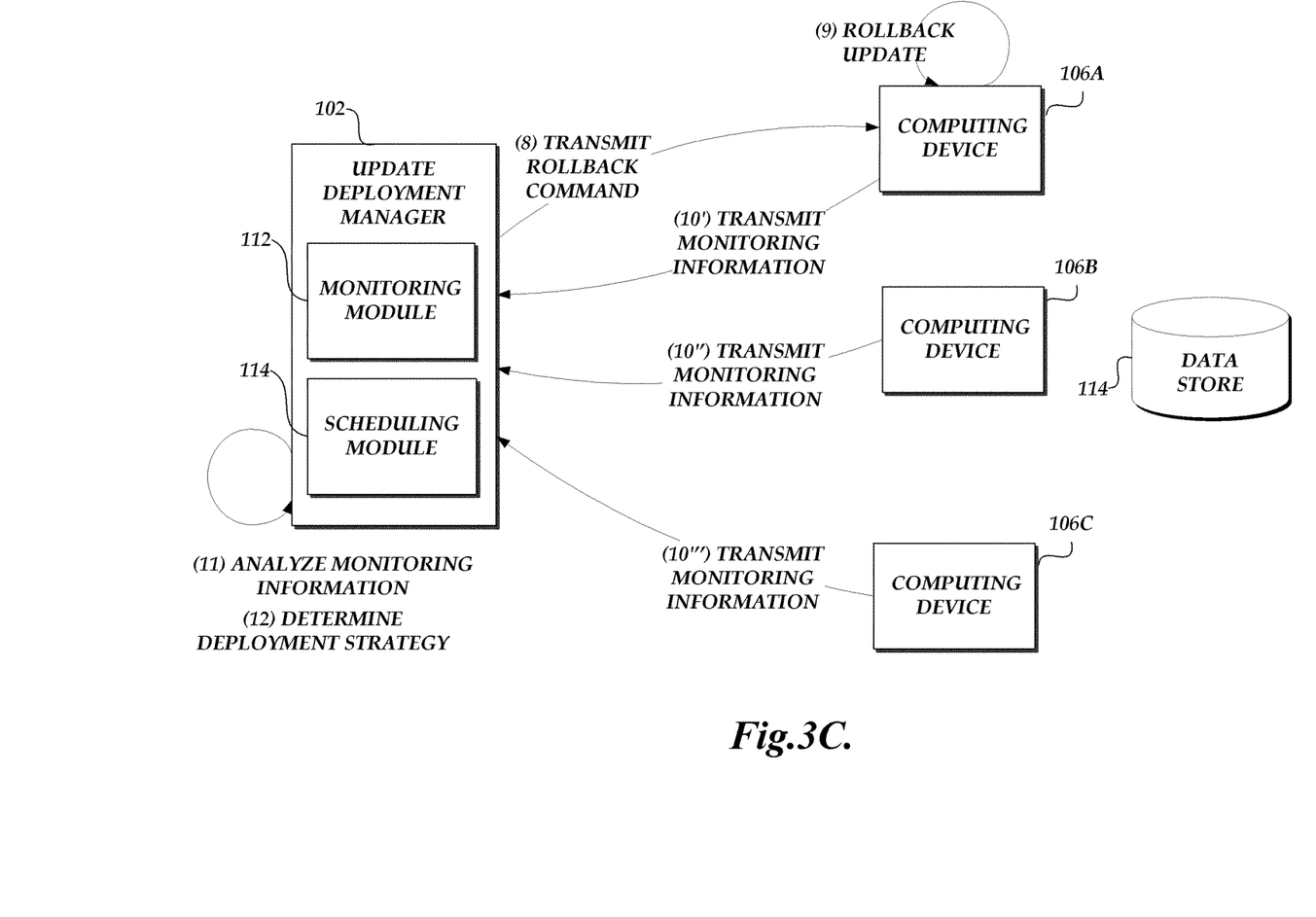

With reference to FIGS. 2 and 3A-C, illustrative interactions for deployment of an update to a number of computing devices will be described. Specifically, FIG. 2 depicts an illustrative interaction for deploying an update to an initial computing device 106A. Further, FIGS. 3A-3C depicts illustrative interactions for modifying deployment of the update in response to analyzed performance metrics. Particularly, FIG. 3A depicts the deployment of an update at a constant rate (e.g., in response to a neutral or minor effect on monitored performance metrics); FIG. 3B depicts the deployment of an update at an accelerated rate (e.g., in response to a positive effect on monitored performance metrics); and FIG. 3C depicts the rollback of deployment of an update (e.g., in response to a negative effect on monitored performance metrics). Each of the illustrative interactions of FIGS. 3A-3C may occur, for example, subsequently to the illustrative interaction of FIG. 2. As such, for clarity, the interactions of FIGS. 3A-3C are numbered to continue the numbering of FIG. 2.

As illustrated in FIG. 2, an update deployment manager 102 may transmit an update deployment command to an initial computing device 106A (such as a computing device 106 of FIG. 1). Though depicted herein with reference to a single initial computing device 106A, in some embodiments, an update may be deployed to a number of initial computing devices 106A, which may include one or more collections of computing devices (such as a collection 110 of FIG. 1). Illustratively, the initial computing device 106A may be any computing device capable of implementing the update. Selection of one or more initial computing devices will be described in more detail with respect to FIG. 4, below.

In response to a received update deployment command, the computing device 106A may retrieve and implement an update. In some embodiments, an update may be retrieved from a data store 108, which may represent a networked data store. For example, as shown in FIG. 2, the computing device 106A may transmit a request for the update reference in the update deployment command to a data store 108. Thereafter, the data store 108 may return the requested update to the computing device 106A. Though retrieval of an update is discussed herein with reference to an external data store, in some embodiments, an update may be alternatively retrieved. For example, in some embodiments, the update deployment manager may be operable to transmit the update to the computing device 106A (e.g., in conjunction with an update deployment command). In other embodiments, a computing device 106A may be configured or operable to store a number of updates, such as on a local data store. As such, retrieval of an update may be unnecessary.

After retrieving a relevant update, the computing device 106A may implement the update. For example, where the update corresponds to executable software (e.g., an application or application installation file), the update may be implemented by executing the update. As a further example, where the update corresponds to a software image, the image may be loaded onto the computing device 106A. Still further, where the update corresponds to a module, configuration file, or other software, the computing device 106A may be otherwise modified to implement the update (e.g., by loading the module or configuration file, etc.).

Thereafter, a number of computing devices 106 may transmit monitoring information corresponding to a set of performance metrics to the update deployment manager 102. Illustratively, the computing devices 106 which transmit such monitoring information may include other computing devices 106 in addition to the initial computing device 106A, such as computing device 106B and 106C. Monitoring of additional computing devices may be beneficial in order to determine long ranging effects of an update deployment. For example, the operation of computing device 106B may depend, directly or indirectly, on computing device 106A. As such, computing device 106B may be effected by the deployment of an update on computing device 106A. Moreover, in some instances, the dependence of computing device 106B on computing device 106A may be complex, and based on interdependence of a number of additional devices. As such, it may not be immediately clear that such dependence exists. As such, computing devices 106 may be monitored regardless of a direct, known connection to the initial computing device 106A.

After receiving monitoring information from a set of computing devices 106A, the update deployment manager 102 (e.g., via the deployment modification module 114) may analyze the received monitoring information in order to determine a potential effect of an update deployment. Analysis of performance metrics may include comparison of a performance metric against historical data regarding the metric. For example, the analyzed monitoring information may correspond to performance metrics received after implementing an update on computing device 106A. Further, deployment manager 102 may have monitored a performance metric prior to implementation of an update on the computing device 106A. As such, analysis of monitoring information may include determining whether a performance metric has changed in response to implementation of an update. For example, CPU utilization of the computing device 106A may have been at 5% prior to implementation of an update. Subsequent to such implementation, CPU utilization of the computing device 106A may have risen to 75%. Such analysis may be carried for any monitored performance metrics, as well as for any computing devices 106 reporting monitoring information. For example, a change in CPU utilization for computing devices 106B and 106C may also be determined.

Subsequent to analysis of received monitoring information, the update deployment manager (e.g., via the scheduling module 114) may determine a deployment strategy in response to the analyzed monitoring information. Illustratively, a deployment strategy may include any one of halting or preventing deployment of the update to additional computing devices (such as computing devices 106A or 106B), rolling back deployment of the update (e.g., removing or de-implementing the update from at least one computing device), modifying a rate of deployment of the update to additional computing devices (e.g., lowering or raising the rate of deployment of the update), or maintaining the current rate of deployment of the update to additional computing devices.

In some embodiments, a deployment strategy may be determined based on a number of thresholds corresponding to one or more performance metrics. For example, a number of thresholds may be specified with respect to overall CPU utilization of a set of monitored computing devices. Illustratively, a threshold may specify that if CPU usage is lowered after deployment of an update to the initial computing device 106A, that deployment of the update should continue at an increased rate (e.g., to two additional computing devices, such as computing devices 106B and 106C). Further, a threshold may specify that if CPU usage is not significantly altered (e.g., changed within a given tolerance), that deployment of the update should continue at an unmodified rate (e.g., to one additional computing device, such as computing device 106B). Still further, thresholds may specify that if CPU usage rises by between 5% and 20%, deployment of the update should be halted, and that if CPU usage rises by greater than 20%, the update should be rolled back (e.g., removed from the initial computing device 106A). Though thresholds are described above with respect to a single performance metric (e.g., CPU usage), thresholds may correspond to any combination of performance metrics. Further, in some embodiments, thresholds may correspond to any combination of computing devices 106. For example, a threshold may specify an action to be taken responsive to a change in CPU usage on a single computing device 106 (e.g., any single computing device 106 or an individually specified computing device 106). As a further example, a threshold may specify an action to be taken responsive to a change in average CPU usage across multiple computing devices 106. In some embodiments, where a threshold corresponds to multiple computing devices, performance metrics monitored on individual computing devices may be weighted. For example, a threshold corresponding to response time may be more sensitive to an increase in such response time on a user-facing system (e.g., a web site) than to an increase in response time on a non-user facing system (e.g., a database). Similarly, where a threshold corresponds to a combination of individual performance metrics, each performance metric may be weighted to determine satisfaction of the threshold. For example, a threshold monitoring both CPU utilization and network utilization may be more easily satisfied based on an increase in CPU utilization than by an increase in network utilization. Such weighting may enable specific control of thresholds for update deployment. Still further, multiple thresholds may be specified, such that satisfaction of any one threshold modifies deployment of an update. Illustratively deployment of an update may be halted when either average response time rises above a given level, or when a given number of requests time-out (e.g., are dropped or not responded to). In some embodiments, multiple thresholds may be given priorities, such that satisfaction of a high priority threshold modifies the deployment of an update, regardless of satisfaction of a lower priority threshold.

Though illustrative examples of thresholds are given above, one skilled in the art will appreciate than thresholds may correspond to any combination of performance metrics monitored on any combination of computing devices, and that multiple thresholds may be specified to control deployment of an update. Further, thresholds may be absolute (e.g., CPU use over X percentage) or relative (e.g., a CPU use increase of over X % over a baseline). In some embodiments, thresholds may be specified by an operator of the update deployment manager. In other embodiments, thresholds may be automatically determined (e.g., by the update deployment manager 102). For example, thresholds may be automatically determined based on the type of update deployed (e.g., a network driver update may monitor network related performance metrics, etc.), based on historical data related to the update (e.g., historically the update has affected a given performance metric), or based on other determinations (e.g., machine learning algorithms, etc.).

Further, in some embodiments, computing device 106A itself may not be required to be monitored. For example, an update may include an update to a specialized low level process implemented on computing device 106A. However, all user-oriented processes may be implemented on other computing devices 106 (such as computing devices 106B and 106C). Moreover, it may be desirable to monitor only performance metrics related to user-oriented processes. As such, it may be unnecessary to monitor performance metrics on the computing device 106A. Selection of computing devices 106 for monitoring will be discussed in more detail with respect to FIG. 4, below.

In addition, though not shown in FIG. 2, in some embodiments, an update deployment manager 102 may be configured to monitor performance metrics of one or more computing devices 106 prior to or during deployment of an update. For example, as will be discussed in more detail with respect to FIG. 4, monitoring information may be received prior to deployment of an update in order to establish a base rate of monitored metrics. Illustratively, this may allow more accurate determination of the changes in monitored metrics in response to a deployed update. In other embodiments, baseline monitored metrics may be obtained from other sources (e.g., by manual selection or analysis of historical data). As such, monitoring of performance metrics prior to update deployment may not be necessary. Similarly, monitoring of performance metrics may occur at any point during implementation of an update. Such monitoring may enable analysis of a portion of an update, if any, that had an effect on a monitored performance metric. Further, in some embodiments, an update may be implemented in multiple stages (e.g., a first stage implementing a first portion of the update, a second stage implementing a second portion of the update, etc.). As such, monitoring of performance metrics may enable the modification of a deployment prior to complete implementation of the update.

With reference now to FIGS. 3A-3C, illustrative interactions for modifying deployment of an update in response to a determined deployment strategy will be described. Specifically, as described above with respect to FIG. 2, deployment of an update may be modified based on analysis of monitoring information corresponding to a number of performance metrics. As such, FIGS. 3A-3C depict illustrative interactions of such modifications. Particularly, FIG. 3A depicts the deployment of an update at a constant rate (e.g., in response to a neutral or minor effect on monitored performance metrics); FIG. 3B depicts the deployment of an update at an accelerated rate (e.g., in response to a positive effect on monitored performance metrics); and FIG. 3C depicts the rollback of deployment of an update (e.g., in response to a negative effect on monitored performance metrics). Each of the illustrative interactions of FIGS. 3A-3C may occur, for example, subsequently to the illustrative interaction of FIG. 2. Though FIGS. 3A-3C depicts a selection of illustrative interactions for modifying deployment of the update in response to analyzed performance metrics, one skilled in the art will appreciate that deployment of an update may be modified in a variety of ways. For example, a rate of deployment of an update may be reduced or halted in addition to the illustrative examples of FIGS. 3A-3C.

Turning to FIG. 3A, an illustrative interaction depicting the deployment of an update at a constant rate (e.g., a rate consistent with previous deployment of the update) is depicted. The interaction of FIG. 3A may be carried out, for example, where monitoring information previously received indicated that deployment of an update should continue at a constant rate. Illustratively, the update deployment manager 102 may have previously determined that, based on monitoring information received from a number of computing devices, update deployment on an initial computing device (e.g., computing device 106A) had a minor or neutral effect on the performance of a monitored set of computing devices (e.g., computing devices 106A-C). As such, the update deployment manager 102 may have determined that update deployment should continue at the previous rate. In this illustrative interaction, the previous rate may correspond to deploying the update to a single computing device 106 at a given time. As such the update deployment manager 102 may determine an additional computing device 106 on which to deploy the update. Such an additional computing device 106 may be selected according to any criteria described above with respect to selection of an initial computing device 106. For example, an additional computing device 106 on which to deploy an update may be selected based on the update, the configuration of the additional computing device 106 or other computing devices 106, or a combination thereof.

In the illustrative interaction of FIG. 3A, the update deployment manager 102 may select to deploy the update on the computing device 106B. Thereafter, the update deployment manager 102 (e.g., via the scheduling module 114) may deploy the update to the selected computing device 106, monitor performance metrics in response to deployment, and modify future deployment of the update according to the monitored metrics. In general, deployment of the update to an additional computing device 106B is similar to deployment of an update to an initial computing device 106, as is described above with respect to FIG. 2. As such, these interactions will not be described in additional detail. In summary, the update deployment manager 102 may transmit an update deployment command to the computing device 106B. Thereafter, the computing device 106B may implement the update, which may include retrieving the update from a data store 114. Further, during or subsequent to implementation of the update, a monitored set of computing devices 106 (e.g., computing devices 106A-106C) may transmit monitoring information to the update deployment manager 102 for analysis. Based on the results of such analysis, the update deployment manager 102 may further determine a deployment strategy for continuing to deploy the update. Illustratively, a determined deployment strategy may include continuing to deploy the update (e.g., to computing device 106C), halting deployment of the update, or rolling back deployment of the update (e.g., removing the update from computing device 106B).

Turning to FIG. 3B, an illustrative interaction depicting the deployment of an update at an increased rate (e.g., a rate higher than previous deployment of the update) is depicted. The interaction of FIG. 3B may be carried out, for example, where monitoring information previously received indicated that deployment of an update should proceed at a faster than previously indicated rate. Illustratively, the update deployment manager 102 may have previously determined that, based on monitoring information received from a number of computing devices, update deployment on an initial computing device (e.g., computing device 106A) had a positive effect on the performance of a monitored set of computing devices (e.g., computing devices 106A-C). As such, the update deployment manager 102 may have determined that update deployment should continue at a higher than normal rate (e.g., because the effects of update deployment appear to be positive). In this illustrative interaction, the previous rate may correspond to deploying the update to a single computing device 106 at a given time. As such the update deployment manager 102 may determine two additional computing devices 106 on which to deploy the update. Such additional computing devices 106 may be selected according to any criteria described above with respect to selection of an initial computing device 106. For example, the additional computing devices 106 on which to deploy an update may be selected based on the update, the configuration of the additional computing devices 106 or other computing devices 106, or a combination thereof.

In the illustrative interaction of FIG. 3B, the update deployment manager 102 may select to deploy the update on computing devices 106B and 106C. Thereafter, the update deployment manager 102 (e.g., via the scheduling module 114) may deploy the update to the selected computing devices 106, monitor performance metrics in response to deployment, and modify future deployment of the update according to the monitored metrics. In general, deployment of the update to two additional computing devices 106B is similar to deployment of an update to an initial computing device 106, as is described above with respect to FIG. 2. As such, these interactions will not be described in additional detail. In summary, the update deployment manager 102 may transmit an update deployment command to the computing devices 106B and 106C. Thereafter, the computing devices 106B and 106C may implement the update, which may include retrieving the update from a data store 114. Further, during or subsequent to implementation of the update, a monitored set of computing devices 106 (e.g., computing devices 106A-106C) may transmit monitoring information to the update deployment manager 102 for analysis. Based on the results of such analysis, the update deployment manager 102 may further determine a deployment strategy for continuing to deploy the update. Illustratively, the update deployment manager 102 may determine that, despite previously having a positive effect, deployment of the update to computing devices 106B and 106C has had a negative effect. Therefore, the update deployment manager 102 may determine that rollback of the update should begin. Conversely, the update deployment manager 102 may determine that the positive effect previously determined with respect to an initial computing device 106 continued after deployment of the update to the additional computing devices 106B and 106C. As such, the update deployment manager 102 may continue to increase the speed of deployment (e.g., to additional computing device 106). If no additional computing devices 106 require deployment of the update, the update deployment manager 102 may determine that deployment of the update is complete, as will be described in more detail with respect to FIG. 4.

Turning to FIG. 3C, an illustrative interaction depicting the rollback of an update (e.g., removal or de-implementation of update from a computing device 106) is depicted. The interaction of FIG. 3C may be carried out, for example, where monitoring information previously received indicated that deployment of an update should be reversed. Illustratively, the update deployment manager 102 may have previously determined that, based on monitoring information received from a number of computing devices 106, update deployment on an initial computing device 106 (e.g., computing device 106A) had a negative or severely negative effect on the performance of a monitored set of computing devices 106 (e.g., computing devices 106A-106C). As such, the update deployment manager 102 may have determined that update deployment should be rolled back. In this illustrative interaction, the update may have previously been deployed an initial computing device 106A. As such, the update deployment manager 102 may transmit a rollback command to the computing device 106A. In response, the computing device 106A may rollback the update (e.g., remove or de-implement the update). Roll back of an update may include uninstalling the update, removing the update from memory of the computing device 106A, undoing any modification to the computing device 106A made by the update, or any combination thereof. During or subsequent to rollback of the update on computing device 106A, a monitored set of computing devices 106 (e.g., computing devices 106A-106C) may transmit monitoring information to the update deployment manager 102 for analysis. Based on the results of such analysis, the update deployment manager 102 may further determine a deployment strategy for deployment of the update. Illustratively, the update deployment manager 102 may determine that rollback of the update with respect to computing device 106A had a positive effect on the monitored performance metrics. The update deployment manager 102 may therefore determine that rollback of the update should continue with respect to any additional computing devices 106 that may have implemented the update. In the illustrative interaction of FIG. 3C, no additional computing devices 106 may have implemented the update, as such, deployment of the update may halt. In some embodiments, where deployment of an update has halted or been rolled back, the update deployment manager 102 may be configured to notify a relevant user (e.g., an operator of the update deployment manager 102) that deployment of the update has failed.

In some embodiments, rollback of an update may not correct previously determined negative effects on performance metrics. For example, a negative effect on performance metrics that occurred subsequent to update deployment on a computing device 106 may have been coincidental. As such, rollback of the update may not correct the negative effect. In some such embodiments, the update deployment manager 102 may be configured to continue deployment of the update. For example, the update deployment manager 102 may temporarily pause deployment in order to collect further monitoring information (e.g., to determine the true cause of a negative effect). As a further example, the update deployment manager 102 may transmit an additional deployment command to a computing device 106 (e.g., computing device 106A, 106B, or 106C) in order to monitor the effects of an additional deployment.

Though the illustrative embodiments of FIGS. 3A-3C are discussed herein as distinct, in some embodiments, the illustrative interactions of FIGS. 3A-3C, or similar interactions, may be combined. For example, an update deployment manager 102 may initially maintain a previously established updated deployment rate, as illustrated in FIG. 3A, and subsequently increase the update deployment rate by deploying an update to multiple additional computing devices, similarly to as illustrated in FIG. 3B. As a further example, an update deployment manager 102 may increase a previously established updated deployment rate (e.g., by deploying an update to two computing devices 106 as illustrated in FIG. 3B), and subsequently begin rollback of the update on one or more computing devices 106 similarly to as illustrated in FIG. 3B (e.g., in response to negative received monitoring information). As such, the interactions of FIGS. 3A-3C are intended to be illustrative, and not limiting.

Though the illustrative interactions of FIGS. 2 and 3A-3C are described in terms of an update deployment manager 102, in some instances, updates may be deployed according to a peer to peer technique, such that an update deployment manager 102 is not required. For example, each computing device 106 may be configured to receive a command to implement an update, to implement that update, and to monitor performance metrics associated with the update. Further, each computing device 106 may be configured to execute an action in response to analysis of the monitored performance metrics. For examples, such responsive actions may include taking no action (e.g., halting deployment), rolling back the update (e.g., uninstalled the update), or transmitting commands to additional computing devices 106 to install a given update. Analysis of monitored performance metrics may further determine the rate at which such commands are transmitted, and the number of computing devices such commands are transmitted to. In this manner, the interactions of FIGS. 2 and 3A-3C may be facilitated without the use of a centralized update deployment manager 102.

Figure 4:
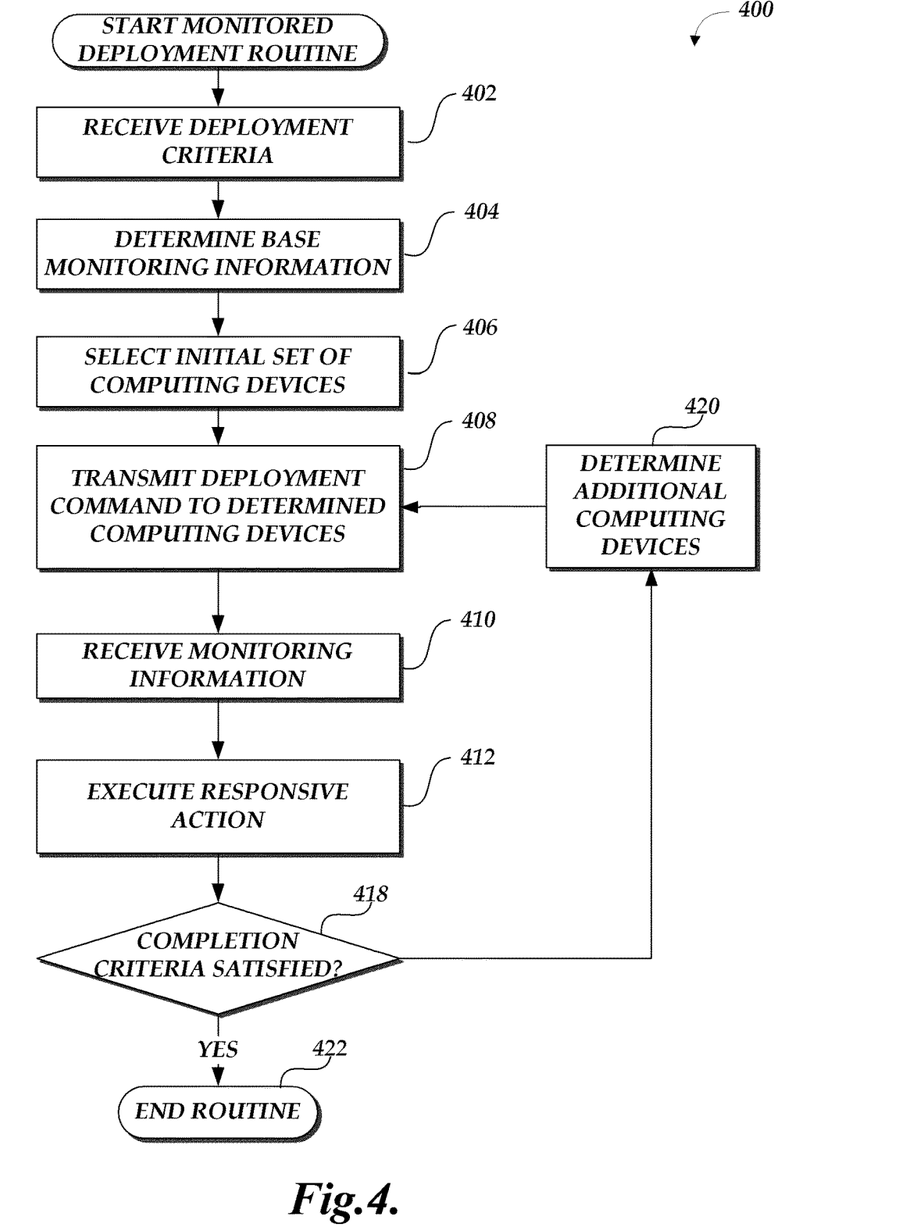
FIG. 4 is a flow diagram depicting an illustrative routine implemented by an update deployment manager of FIG. 1 for managing deployment of an update to a number of computing devices.

With reference to FIG. 4, one embodiment of a routine 400 implemented by an update deployment manager 102 for deploying an update to computing devices, such as computing devices 106 of FIG. 1, will be described. Specifically, at block 402, an update deployment manager 102 may receive a set of criteria for deployment of an update to a number of computing devices, such as computing devices 106 of FIG. 1. Deployment criteria may include, by way of non-limiting example, a set of computing devices on which to deploy an update, a set of monitored computing devices 106 to monitor for potential effects of deployment of the update, a set of performance metrics by which to monitor the monitored computing devices, and a set of monitoring criteria by which to analyze monitoring information received from monitoring computing devices. As described above, in some embodiments, monitoring criteria may include thresholds for values of monitored information, as well as actions taken in response to meeting a threshold. For example, monitoring criteria may specify that if a given performance metric increases or decreases by a given amount (e.g., X %, Y amount, etc.), deployment of the update should increase in rate by a given amount. Monitoring criteria may include any combination of such thresholds. In some embodiments, thresholds may be associated with a priority, such that if more than one threshold is met, the action taken corresponds to the higher priority threshold. Still further, in some embodiments, deployment criteria may include a deployment schedule specifying an order for deployment of an update, or criteria for selection of such an order. For example, a deployment schedule may specify that an update should be deployed to all computing devices in a given region prior to computing devices in a second region. Moreover, a deployment schedule may specify a rate of deployment of an update (e.g., a linear deployment rate, an exponential deployment rate, etc.).

Thereafter, at block 404, the update deployment manager 102 may determine base monitoring information for a number of monitored computing devices. In some embodiments, the monitored computing devices may correspond to each computing device to receive an update. In other embodiments, the monitored computing devices may include other computing devices, such as computing devices which are reliant on the computing devices to receive an update. For example, monitored computing devices may include web servers or other "front end" computing devices, where an update to a "back end" system (e.g., a database) is to be deployed. As such, deployment of an update may be controlled based on its effect on other computing devices, such as those hosted end user services. In still more embodiments, monitored computing devices may include both computing devices to receive an update as well as computing devices which are not intended to receive an update.

Illustratively, base monitoring information may be determined by monitoring the set of monitored computing devices (e.g., as specified in the received deployment criteria) for an amount of time prior to deployment of the update. Illustratively, such monitoring may enable the update deployment manager 102 to determine a change in a performance metric prior to, during, and after deployment of an update. In other embodiments, base information may be determined by receiving historical data regarding performance metrics (e.g., from the set of monitored computing devices, from other similar computing devices, etc.). In still more embodiments, base monitoring information may be received via manual input (e.g., from an operator of the update deployment manager 102) or determined automatically. Automatic determination of base monitoring information may include, for example, estimating performance metrics of a computing device based on the configuration (e.g., hardware, software, or specific configuration thereof) of the computing device. Moreover, in some embodiments, monitoring criteria may not be dependent on base monitoring information. For example, monitoring criteria may include absolute thresholds (e.g., CPU use over 50%, more than 20% dropped packets, etc.). As such, base monitoring information may not be required, and may therefore be omitted.

At block 406, the update deployment manager 102 may select an initial set of computing devices to receive a deployed update. Illustratively, the initial set of computing devices may correspond to a subset of the computing devices to receive the update. By initially deploying the update to only a subset of computing devices, the potential effects of the update may be determined without requiring a large amount of computing resources, and while limiting the potential impact of such effects. A set of initial computing devices may be selected according to any number of criteria. In one embodiment, an initial set of computing devices may be selected manually (e.g., by an operator of the update deployment manager 102). In another embodiment, an initial set of computing devices may be selected automatically or semi-automatically. For example, an operator of the update deployment manager 102 may specify criteria for selection of computing devices (e.g., based on configuration, geographic location, requirements for reliability, etc.). As a further example, the update deployment manager 102 may be configured to automatically select an initial set of computing devices based on any of the above criteria.

At block 408, the update deployment manager 102 may transmit the update to the determined computing devices (e.g., the initial set of computing devices) for implementation of the update. Thereafter, either during implementation of the update on the initial set of computing devices or subsequent to such implementation, the update deployment manager 102 may receive monitoring information from the monitored set of computing devices. Monitoring information may include information related to any number of performance metrics. Performance metrics are described in more detail above with reference to FIG. 1, but may include, by way of non-limiting example, response time (e.g., latency), response success or failure rate (e.g., dropped packets, ping failures, reported error rate, etc.), computing resource utilization (CPU use, RAM use, network bandwidth use, etc.), or other specialized metrics, such as those specified in SLAs for a given computing device.

At block 412, the update deployment manager 102 may execute a responsive action based on the received performance information. In some embodiments, a responsive action may include decreasing or increasing the rate of deployment of an update. For example, a rate of deployment may specify that a single computing device is to receive an update at any given time. As such, a responsive action may include doubling the rate of deployment, such that two computing devices receive the update during a future deployment stage. Conversely, a rate of deployment may specify that two computing devices are to receive an update at any given time. As such, a responsive action may include reducing the rate of deployment, such that only a single computing device receives the update during each future deployment stage. Though examples of deployment rates may be discussed as linear (e.g., X computers at any given deployment stage), any algorithm may be used to specify a deployment rate. For example, deployment may be exponential, such that a first initial computing device receives the update, two second computing devices receive the update during a second deployment stage, four third computing devices receive the update during a third deployment stage, etc.

A responsive action may further include halting or rolling back deployment of the update. For example, negative performance metrics may cause the deployment process to be temporarily or permanently halted. As a further example, severely negative performance metrics may cause the update to be rolled back, or de-implemented from computing devices that have previously implemented the update. As described above, in some embodiments, a responsive action may be determined based on monitoring criteria. For example, where monitoring criteria correspond to thresholds, a responsive action may be determined based on such thresholds. Illustratively, if the received monitoring information satisfies a given threshold, the responsive action corresponding to the threshold may be executed.

Thereafter, at block 418, the update deployment manager 102 may determine whether a set of completion criteria is satisfied. Completion criteria may be included, for example, in the previously received deployment criteria. Further, in some embodiments, completion criteria may be automatically determined by the update deployment manager 102, or may be manually specified. For example, completion criteria may allow a routine to complete where each of the set of computing devices to receive an update have implemented the update, and where received monitoring information indicates that no further responsive action is necessary. Further, completion criteria may allow a routine to complete where a complete rollback of an update has been conducted, or where the update deployment has been halted. In these embodiments, the update deployment manager 102 may be configured to send an error to, for example, the operator of the update deployment manager 102 to notify the operator that such a failure occurred. If the set of completion criteria are satisfied, the routine may end at block 422.

However, if the set of completion criteria is not satisfied, the routine may continue at block 420. Completion criteria might not be satisfied, for example, if an update has not been deployed (or rolled back) on all of the set of computing devices to receive the update. As such, at block 420, update deployment may continue, where additional computing devices are determined to receive the update. Additional computing devices may be selected based on the received deployment criteria, as modified by any responsive action. For example, the received deployment criteria may specify a rate of deployment of the update (e.g., two computing devices per round of deployment). However, this rate of deployment may have been modified by a previous responsive action, as described above. As such, the update deployment manager 102 may select additional computing devices to receive an update in accordance with the modified deployment criteria. Thereafter, the routine 400 may transmit a deployment command to the newly determined computing devices. The routine 400 may continue as described above. Illustratively, monitoring information may continue to be received, which may modify the deployment of the update to additional computing devices, until a completion criteria is satisfied. Thereafter, the routine may end at block 422.

In some embodiments, monitoring information collected during routine 400 may be stored in a data store, such as data store 108 of FIG. 1. Illustratively, such monitoring information may be used during future deployment of an update in order to determine relevant performance metrics for monitoring, or in order to notify a user of a computing device of performance metrics than may be impacted by deployment. For example, in some embodiments, updates may correspond to services (or updates, configurations, or addition to such services) that may be acquired by end users for implementation on one or more computing devices. As such, end users wishing to deploy an update on a computing device may be informed prior to deployment of potential effects on performance metrics, as recorded in stored monitoring information corresponding to previous deployments of the update.

Moreover, as described above, in some embodiments, it may be unclear what specific performance metrics would be impacted by a given update. As such, during initial deployment of the update, a wide variety of performance metrics may be monitored. However, during deployment of an update (e.g., during the routine 400 of FIG. 4), correlations between a deployment and a set of performance metrics may be determined. As such, though not shown in FIG. 4, the routine 400 may include modifying the monitored performance metrics based on previously acquired monitoring information. For example, analysis of monitoring information may reveal that a given update has little if any effect on network use, but a large effect on available RAM. As such, network use may cease to be monitored, while increased available RAM may continue to be monitored, or may be monitored more closely.

Still further, though a single routine 400 is displayed in FIG. 4, in some embodiments, multiple instances of routine 400 may be executed simultaneously. For example, a user (e.g., an operator of the update deployment manager 102) may desire to test multiple versions or flavors of an update. As such, an instance of the routine 400 may be executed for each individual version of the update. In addition, the deployment criteria may modify the rate of deployment of the update based on a set of performance metrics associated with the computing devices on which the update is deployed. As such, the number of computing devices which receive any given version of an update would be proportional to the performance of that update (as measured by a set of performance metrics) relative to other updates. In this way, the "superior" update may be determined to be the update deployed on the most computing devices. In some such embodiments, updates may be configured to be deployed to additional computing devices, regardless of whether another version of the update was previously deployed. As such, the "superior" update may eventually overtake other updates, such that it is installed on all or substantially all computing devices. As such, multiple instances of routine 400 may facilitate deployment of multiple versions or flavors of an update, such that only an update associated with the highest performance metrics is maintained.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing update deployment, the system comprising:
    a data store including computer-executable instructions; and
    one or more processors configured to execute the computer-executable instructions, wherein execution of the computer-executable instructions causes the system to:
        obtain an update to be deployed and implemented within a target computing environment, wherein the target computing environment includes a plurality of receiving computing devices on which to implement the update to provide functionality corresponding to the update on behalf of at least one client;
        determine a deployment schedule corresponding to a schedule for deployment of the update to the plurality of receiving computing devices;
        determine criteria for modifying the schedule for deployment, wherein the criteria comprise rules for modifying the schedule for deployment based at least in part on a measured effect on a set of monitored computing devices of deploying the update;
        cause deployment of the update to at least a first computing device of the plurality of receiving computing devices;
        receive, from the set of monitored computing devices, monitoring information representing a measured effect of deploying the update to the first computing device;
        modify the deployment schedule according to the criteria based at least in part on the received monitoring information, wherein modifying the deployment schedule comprises at least one of increasing a rate of deployment when the measured effect of deploying the update to the first computing device is positive or decreasing the rate of deployment when the measured effect of deploying the update to the first computing device is negative; and
        cause deployment of the update in accordance with the modified deployment schedule.

2. The system of claim 1, wherein the one or more computing devices execute further computer-executable instructions that cause the system to modify an order in which computing devices of the plurality of receiving computing devices are scheduled to receive the update.

3. The system of claim 1, wherein the one or more computing devices execute further computer-executable instructions that cause the system to determine a set of performance metrics representing the measured effect of deploying the update to the first computing device based at least in part on monitoring information received during a prior deployment of the update.

4. The system of claim 1, wherein the one or more computing devices execute further computer-executable instructions that cause the system to store the received monitoring information in at least one data store.

5. The system of claim 1, wherein the criteria comprise a set of thresholds, and wherein each of the set of thresholds is associated with at least one performance metric and at least one action responsive to satisfaction of the threshold.

6. The system of claim 1, wherein the schedule of deployment specifies at least one of a linear deployment rate and an exponential deployment rate.

7. A computer-implemented method for managing update deployment, the method comprising:
    determining a schedule corresponding to deployment of an update to a set of receiving computing devices;
    obtaining rules for modifying the schedule based at least in part on a measured effect on a set of monitored computing devices of deploying the update;
    deploying the update to a first computing device of the set of receiving computing devices;
    receiving, from the set of monitored computing devices, monitoring information representing a measured effect of deploying the update to the first computing device;
    updating the schedule based at least in part on applying the rules for modifying the schedule to the measured effect of deploying the update to the first computing device, wherein modifying the schedule of deployment comprises at least one of increasing a rate of deployment when the measured effect of deploying the update to the first computing device is positive or decreasing the rate of deployment when the measured effect of deploying the update to the first computing device is negative; and
    scheduling deployment of the update to additional receiving computing devices in the set of receiving computing devices in accordance with the updated schedule.

8. The computer-implemented method of claim 7, wherein decreasing the rate of deployment comprises halting deployment of the update.

9. The computer-implemented method of claim 7, wherein decreasing the rate of deployment comprises scheduling removal of the update from the first computing device.

10. The computer-implemented method of claim 7, wherein the rules define a magnitude of modification of the rate of deployment to the set of receiving computing devices.

11. The computer-implemented method of claim 7, wherein updating the deployment schedule comprises changing the rate of deployment from linear to exponential.

12. The computer-implemented method of claim 7, wherein the rate of deployment is modified in proportion to a change in a set of performance metrics associated with the set of monitored computing devices relative to a set of baseline performance metrics.

13. The computer-implemented method of claim 7 further comprising determining a set of performance metrics for measuring the effect of deploying the update to the first computing device based at least in part on attributes of the update, wherein the monitoring information includes values for the set of performance metrics.

14. The computer-implemented method of claim 7 further comprising determining a set of performance metrics for measuring the effect of deploying the update to the first computing device based at least in part on attributes of the set of receiving computing devices, wherein the monitoring information includes values for the set of performance metrics.

15. The computer-implemented method of claim 7 further comprising determining a set of performance metrics for measuring the effect of deploying the update to the first computing device based at least in part on attributes of the set of monitored computing devices, wherein the monitoring information includes values for the set of performance metrics.

16. A computer-readable, non-transitory storage medium having computer-executable instructions for managing package deployment, wherein the computer-executable instructions, when executed by a computing system, cause the computing system to:
- determine a deployment schedule corresponding to deployment of a package to each of a set of receiving computing devices within a target computing environment;
- select at least a first computing device within the set of receiving computing devices to initially implement the package;
- cause implementation of the package on the first computing device;
- receive monitoring information representing a measured effect of deploying the package to the first computing device;
- analyze the monitoring information to determine a modification to the deployment schedule, wherein the modification to the deployment schedule comprises at least one of an increase in a rate of deployment when the measured effect of deploying the package to the first computing device is positive or a decrease in the rate of deployment when the measured effect of deploying the package to the first computing device is negative;
- modify the deployment schedule in accordance with the determined modification; and
- schedule deployment of the package to at least a second computing device within the set of receiving computing devices in accordance with the modified deployment schedule.

17. The computer-readable, non-transitory storage medium of claim 16, wherein a type of information within the monitoring information is determined based on a prior deployment of a similar package.

* * * * *